(12) United States Patent
Morris et al.

(10) Patent No.: US 8,266,520 B2
(45) Date of Patent: *Sep. 11, 2012

(54) SYSTEM AND COMPUTER PROGRAM PRODUCT FOR EFFICIENTLY PROCESSING COMMENTS TO RECORDS IN A DATABASE, WHILE AVOIDING REPLICATION/SAVE CONFLICTS

(75) Inventors: Benjamin R. Morris, New York, NY (US); Vincent Ierace, New Fairfield, CT (US)

(73) Assignee: Google Inc., Mountain View, CA (US)

( * ) Notice: Subject to any disclaimer, the term of this patent is extended or adjusted under 35 U.S.C. 154(b) by 766 days.

This patent is subject to a terminal disclaimer.

(21) Appl. No.: 12/354,845

(22) Filed: Jan. 16, 2009

(65) Prior Publication Data
US 2009/0125834 A1    May 14, 2009

Related U.S. Application Data

(63) Continuation of application No. 11/165,009, filed on Jun. 23, 2005, now Pat. No. 7,552,383.

(51) Int. Cl.
*G06F 17/00* (2006.01)
*G06F 17/20* (2006.01)
*G06F 17/22* (2006.01)

(52) U.S. Cl. .................................. 715/230; 715/233
(58) Field of Classification Search .............. 715/512, 715/738, 764

See application file for complete search history.

(56) References Cited

U.S. PATENT DOCUMENTS

| | | | |
|---|---|---|---|
| 7,689,563 B1 * | 3/2010 | Jacobson | 707/663 |
| 2006/0004914 A1 * | 1/2006 | Kelly et al. | 709/219 |
| 2006/0168315 A1 * | 7/2006 | Daniell et al. | 709/237 |
| 2011/0202611 A1 * | 8/2011 | Malik et al. | 709/206 |

* cited by examiner

*Primary Examiner* — Simon Ke
(74) *Attorney, Agent, or Firm* — Young Basile Hanlon & MacFarlane, P.C.

(57) ABSTRACT

A system for displaying comment documents within a parent document that avoids replication/save conflicts regardless of the number of users having local document replicas. The graphical user interface to a parent document provides the user with the ability to enter a comment with regard to the parent document. In response to indication that a comment is to be entered, the user interface to the parent document allows the user to enter content to be included in the comment. In response to indication that the entered comment should be saved, the system operates to capture the comment contents and store it into a newly created comment document associated with the parent document. After a comment document has been created, its contents are presented through a predetermined display region within the user interface to the parent document. In response to detection of a transition of a parent document from a state in which comments can be added to a state in which comments cannot be added, the system locates all comment documents associated with the parent document, copies the contents of those comment documents into the parent document such that they are displayed as part of the parent document, and deletes all associated comment documents for that parent document.

11 Claims, 7 Drawing Sheets

| COMMENTS | | |
|---|---|---|
| Parent UNID | Created | Comment |
| 77a | June 3, 2005 01:00 PM EDT | And I've seen it with just steps A and B. - June 3, 2005 01:00 PM EDT - Mary Jones |
| 77a | June 3, 2005 02:43 PM EDT | I've experienced this problem in Application Z. - June 2, 2005 02:43 PM EDT - John Smith |
| 81e | May 20, 2005 03:00 PM EDT | I think this one is fixed - May 20, 2005 03:00 PM EDT - Joe Johnson |
| 81e | May 20, 2005 02:00 PM EDT | New code is ready - May 20, 2005 02:00 PM EDT - Jane Murphy |
| 90 | May 20, 2005 02:00 PM EDT | I've reproduced the problem - May 20, 2005 02:00 PM EDT - Jane Murphy |
| ... | | |

Comments Table User Interface 70
74
76
78
Comments Table 72

*FIG. 7*

SYSTEM AND COMPUTER PROGRAM PRODUCT FOR EFFICIENTLY PROCESSING COMMENTS TO RECORDS IN A DATABASE, WHILE AVOIDING REPLICATION/SAVE CONFLICTS

CROSS-REFERENCE TO RELATED APPLICATIONS

The present application is a continuation under 35 U.S.C. § 120 of commonly assigned prior U.S. application Ser. No. 11/165,009, filed Jun. 23, 2005, now U.S. Pat. No. 7,552,383.

FIELD OF THE INVENTION

The present invention relates generally to computer application programs for sharing documents among multiple users, sometimes referred to as groupware, and more specifically to a system for displaying response documents in a database, in chronological order, within a parent document, and avoiding replication/save conflicts regardless of the number of people using local document replicas.

BACKGROUND OF THE INVENTION

As it is generally known, software that supports multiple users working on related tasks across one or more communication networks is often referred to as "groupware". Groupware applications allow multiple users to access the same data, and may also provide tools and mechanisms to assist users in coordinating and managing projects. One example of a groupware application is Lotus Notes®, which is a multi-function groupware system and development environment.

A well known use of groupware products is as databases for users to submit problem reports to for support staff to work on. These systems may be referred to as "tracking databases." Adequate solutions in this area must support significant amounts of communication between end users and the support team. Without an effective groupware solution, large numbers of electronic mail (e-mail) messages may be exchanged between end users and the support team to resolve each issue. Such e-mail message "flurries" may lack adequate records, and important information can be missed or lost if the right people are not copied on every correspondence.

In many cases, groupware has been used by support teams to track their progress in resolving outstanding issues. However, problems associated with independent e-mail messaging have persisted. One approach to avoiding the use of separate e-mail messaging in this area has been to provide a user interface construct, such as a comment button, within an issue record for an issue or topic, to allow users to enter comments directly onto the issue record form. However, during investigation of a given problem, both end users and support staff may enter many comments into the issue record. Accordingly, large numbers of people may simultaneously be accessing the issue record. If two or more people attempt to add their comments simultaneously, many problems can arise, potentially resulting in comments being lost and general dissatisfaction with the database.

Another approach taken by existing systems has been to create separate "response" documents containing each user's comments with respect to an issue record. Using such a system, each commenting user works directly with a separate comment document, and conflicts between two users in this regard are accordingly not an issue. However, there remain significant drawbacks to this solution, effectively making it unusable for a large-scale tracking database.

First, as more and more comments are added, the database begins to fill up with large numbers of comment documents supporting a single issue record, and any user wishing to understand the entire problem is forced to read through each separate document in order to see all of the comments. Second, as issues are resolved, all of the supporting comment documents continue to exist, and the database quickly grows out of control in terms of disk space and total number of documents.

For the above reasons and others, it would be desirable to have a new system for maintaining a database such as a tracking database. The new system should enable users to enter comments with respect to an issue record or the like in a way that is intuitive, and such that all comments can conveniently be reviewed. The new system should further operate without causing excessive numbers of comment documents to be maintained so that overall system performance is not unduly compromised.

SUMMARY OF THE INVENTION

To address the above described and other shortcomings of the prior art, a system for displaying comment documents in a chronological ordering within a parent document is disclosed that avoids replication/save conflicts regardless of the number of users having local document replicas. In the disclosed system, the graphical user interface to a parent document, such as an electronic form interface to an issue record in an issue tracking database, provides the user with the ability to enter a comment with regard to the parent document. This ability may be provided through presentation of a graphical user interface button display object or the like that can be clicked on by the user. In response to a user providing indication that a comment is to be entered, the user interface to the parent document goes into an edit mode, allowing the user to enter content to be included in the comment. The graphical user interface to the parent document further provides the user with the ability to save the comment, for example by way of another graphical user interface button display object or the like.

When the user provides an indication that the entered comment should be saved, the disclosed system captures the comment contents and stores it into a newly created comment document associated with the parent document. The creation of comment documents is transparent to the user, and they may be associated with the parent document in any appropriate manner. After a comment document has been created, its contents are presented through a predetermined display region within the user interface to the parent document.

The disclosed system further associates a status with each parent document, indicating whether the parent document is in a state in which comments can still be added, or is in a state in which comments can no longer be added. The status of a parent document may be changed by a user through a graphical user interface to the parent document. In response to detection of a transition of a parent document from a state in which comments can be added to a state in which comments can no longer be added, the disclosed system locates all comment documents associated with the parent document, copies the contents of those comment documents into the parent document such that the comment document contents are displayed as part of the parent document, and deletes the associated comment documents for that parent document.

Thus there is disclosed a new system for maintaining a database, such as a tracking database, that enables users to enter comments with respect to a parent document, such as an issue record, in a way that is intuitive, and such that all comments for the parent document can conveniently be reviewed regardless of the specific state of the parent document with regard to whether or not comments can be added. The new system further operates without causing excessive numbers of comment documents to be maintained, and as a result overall system performance is not compromised.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
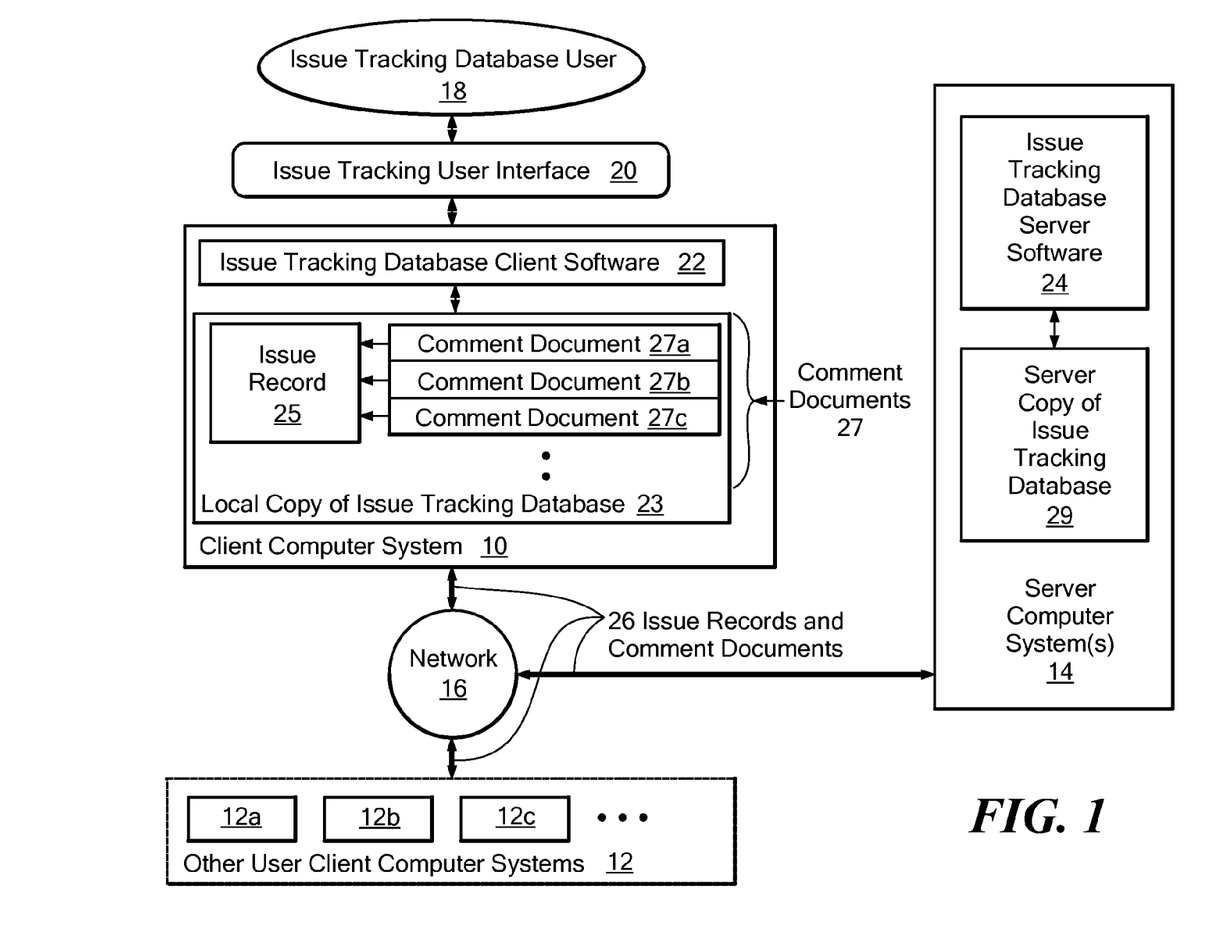
FIG. 1 is a block diagram illustrating hardware and software components in an illustrative embodiment.

As shown in FIG. 1, in an embodiment of the disclosed system, a number of software components execute on various computer systems, shown for purposes of illustration in FIG. 1 including a client computer system 10 and other client computer systems 12, shown including a number of client computer systems 12a, 12b, 12c, etc., as well as one or more server computer systems 14. The client computer systems 10 and 12, and server computer system(s) 14 may, for example, each include at least one processor, program storage, such as memory, for storing program code executable on the processor, and one or more input/output devices and/or interfaces, such as data communication and/or peripheral devices and/or interfaces. The client computer systems 10 and 12 and server computer system(s) 14 are communicably connected by a data communication network 16, such as a Local Area Network (LAN), the Internet, or the like, which may also be connected to a number of other client and/or server computer systems. The client computer systems 10 and 12 and server computer system(s) 14 may further include appropriate operating system software.

During operation of the embodiment shown in FIG. 1, an issue tracking database user 18 is provided with an issue tracking user interface 20 by issue tracking database client software 22. Issue tracking user interface 20 includes a graphical user interface (GUI), having a number of interface display objects, such as buttons or the like, and/or menus that can be clicked on using a mouse user interface device or the like to trigger associated functionalities. As described further below, the issue tracking user interface 20 provides an interface to issue tracking records.

The issue tracking database client software 22 may, for example, operate with a local copy 23 of an issue tracking database. The local copy 23 of the issue tracking database is shown for purposes of illustration as including at least one issue record 25, which corresponds, for purposes of explanation, to an system performance or operations issue relating to support of a number of information systems by a support team. The issue record 25 is linked to a number of comment documents 27, shown for purposes of illustration as including comment document 27a, comment document 27b, comment document 27c, etc. The comment documents 27 may be linked in any particular way to the issue record 25, for example by way of a unique identifier associated with the issue record 25. The comment documents 27 are created transparently to the issue tracking database user 18 in response to the user 18 entering or otherwise indicating comment content through the issue tracking user interface 20. In the illustrative embodiment of FIG. 1, the issue tracking user interface 20 provides an interface to the issue record 25, which provides the user 18 with the ability to enter comment content that is stored in the comment documents 27.

When the user 18 replicates the local copy of the issue tracking database 23 to the server computer system 14, the issue tracking database software 24 stores the issue record 25 and associated comment documents 27 into the server copy 29 of the issue tracking database. When either the client computer system 10 or one of the client computer systems 12 opens up an issue record or obtains a local copy of the issue tracking database, the issue record and any associated comment documents, or the complete issue tracking database including the issue record and any associated documents, are copied to the client system from the server copy 29 of the issue tracking database. Thus issue records and comment documents 26 are conveyed over the network 16 between the client computer system 10, client computer systems 12, and the server computer system 14.

As described further below, when an issue record has a status that allows comments to be added to it, one or more comment documents may exist containing any previously entered comment contents associated with that issue record. When the disclosed system detects that an issue record has changed status to one in which comments can no longer be added, the contents of those comment documents associated with the issue record are copied into the comment record, and the comment documents are deleted. Thus when a user opens an issue record, the disclosed system may obtain the comment contents either from a number of comment documents related to the issue record, or from within the issue record itself, depending on whether the issue record is in a state in which comments can be added, or a state in which comments cannot be added.

While the embodiment of FIG. 1 is described, for purposes of explanation, as involving use of an issue tracking database, the present invention is not so limited. Accordingly, the present invention may be embodied using any specific database, storing any specific type of data. Moreover, the database of the present system may be of any specific kind, such a relational database, non-relational database, or other type of groupware involving the sharing of information between users over a network.

Similarly, while the client computer system 10 is shown including a local copy of the database, the disclosed system is not limited to such a use or embodiment. The present system accordingly may or may not involve the use of local copies of the database. Advantageously, separate comment documents created on the client computer system 10 and/or client computer systems 12 can be created locally on those client computer systems, by different users for different local copies of a single associated issue record, and subsequently saved to the server copy 29 of the tracking database without causing save/replication conflicts between different copies of the associated issue record.

Additionally, while the embodiment of the disclosed system in FIG. 1 is described in terms of an issue record 25 and associated comment documents 27, these terms are used for purposes of explanation only. The issue record 25 and/or comment documents 27 may, for example, each consist of groups of related fields in a database storing data about a subject or activity, and/or a file in a file system.

Figure 2:
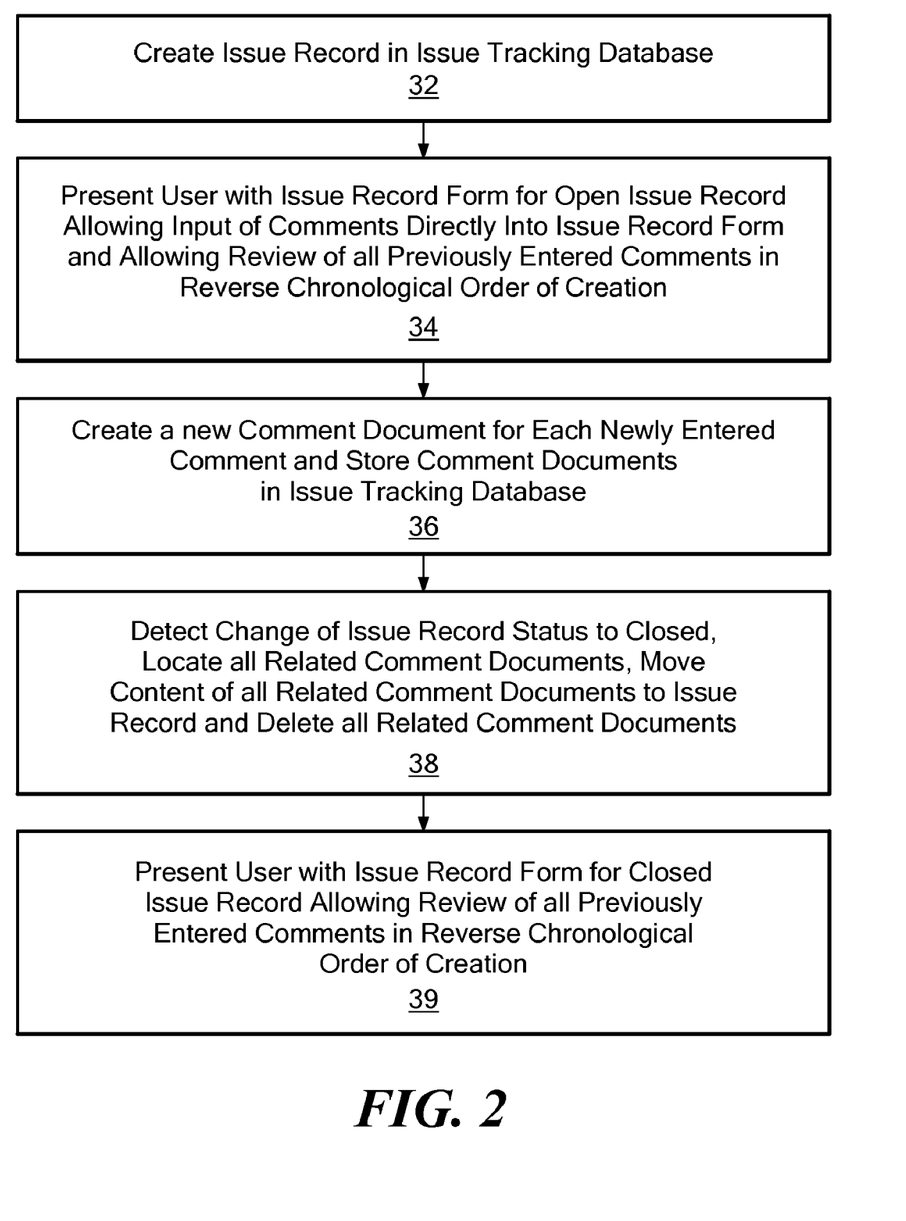
FIG. 2 is a flow chart illustrating steps performed in an illustrative embodiment.

FIG. 2 is a flow chart illustrating steps performed by an illustrative embodiment of the disclosed system. The steps of FIG. 2 may, for example, be performed by some combination of the tracking database client software 22 and/or tracking database server software 24 of FIG. 1. At step 32, the disclosed system creates an issue record in an issue tracking database. Creation of an issue record at step 32 may, for example, be performed in response to user actions in a graphical user interface. At step 34 the disclosed system presents a user with an issue record user interface, such as an issue record electronic form. Presentation of the issue record user interface at step 34 may, for example, be in response to a user request identifying the use record by name, topic, or unique identifier, and provided through a graphical user interface.

At step 34, the issue record being opened is in a state in which comments can be added. Accordingly, the issue record form presented to the user at step 34 allows input of comments directly into the issue record form. The issue record form presented at step 34 further provides a view of all previously entered comment content for the issue record created at step 32, and provided by any user. The disclosed system obtains the previously entered comment content presented at step 34 from any previously created comment documents associated with the issue record, responsive to a determination that the issue record is in a state that allows comments to be added to the issue record. Such previously entered comment documents may, for example, be obtained from the server copy 29 of the tracking database. The previously entered comment content may, for example, be presented in reverse chronological order, such that most recently entered comments are presented at a top-most location within a list of previous comments or the like.

At step 36, the disclosed system obtains comment content from the user, and responds by creating a new comment document to store the newly received comment content. For example, the disclosed system may provide a display object, menu option, or the like, for the user to select or click on in order to enter a new comment. When the user is finished entering in the new comment, the disclosed system may provide another display object, menu option, or the like, for the user to save the comment content they have entered. The creation of the new comment document may, for example, be in response to detection of the user clicking on or selecting such a display object, menu object, or the like. In the embodiment of FIG. 2, the creation of the new comment document is transparent to the user entering the comment content, and no indication of the newly created document is provided to the user. For example, the newly created comment document may be created by tracking database client software 22, and be stored within the local copy 23 of the tracking database, as shown in FIG. 1, for later replication to the server copy 29.

At step 38, the disclosed system detects a change in status for the issue record, such that comments can no longer be added to the issue record, and thus the status of the issue record is "closed". In response to this change of status, the disclosed system locates all comment documents related to the issue record, and moves the content of those comment documents into the body of the issue record. The comment documents for the issue record are then deleted. When at step 39 a user accesses the issue record in a state which no comments can be added, the comment content from the previously deleted comment documents is presented to the user as part of the user interface to the issue record, for example in reverse chronological order, within a predetermined region of the issue record user interface form. The presentation of comment contents at step 39 is provided based on comment contents stored within the issue record, and without attempting to access any comment documents for the issue record when the issue record is in a state in which no comments can be added.

Figure 3:
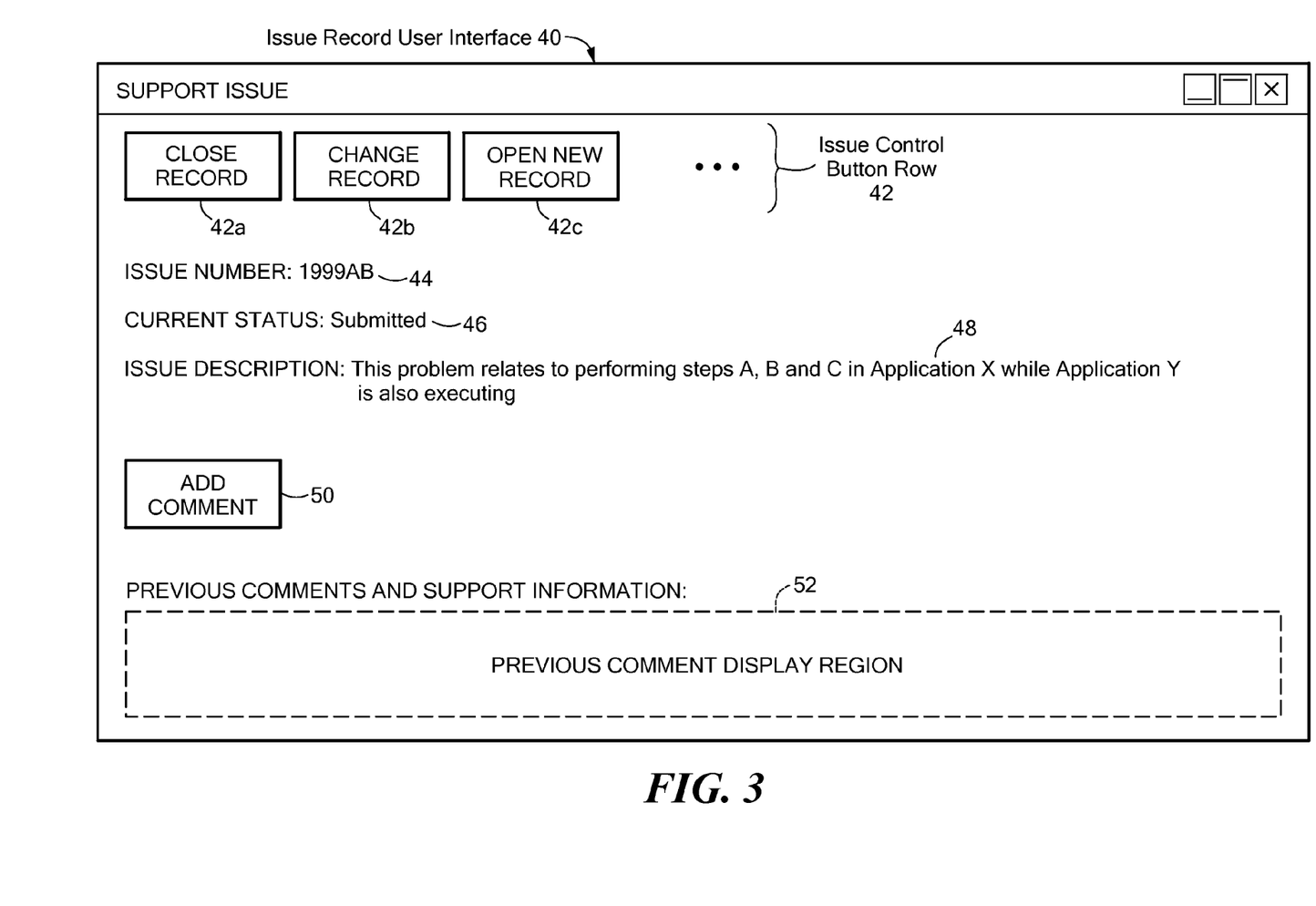
FIG. 3 is a simplified screen shot of a user interface to an issue record in an illustrative embodiment, including an "Add Comment" button and a "Close Record" button.

FIG. 3 shows a simplified screen shot, for example an issue record user interface 40, provided as part of a user interface provided by an embodiment of the disclosed system, such as the issue tracking user interface 20 of FIG. 1. In the issue record user interface 40 of FIG. 3 is shown including an issue control button row 42, including a number of button display objects. The issue control button row 42 is shown including a close record button 42a, a change record button 42a, and an open new record button 42c. When a user clicks on the close record button 42a, the disclosed system operates to change a current status of the issue record represented by the issue record user interface 40 to a "closed" status, such that comments can no longer be added. When a user clicks on the change record button 42b, the disclosed system operates to change the issue record user interface 40 to represent another issue record. When a user clicks on the open new record button 42c, the disclosed system operates to open a new issue record.

The issue record user interface 40 further includes an issue number 44, and a current status indication 46. In the example of FIG. 3, the issue status indication 46 indicates a current status of "Submitted", which is an example of a status for an issue record in which comments can be added. An issue description 48 is further provided. An add comment button 50 is included in the issue record user interface 40. When a user clicks on the add comment button 50, the disclosed system operates to enter a comment entry mode, as further illustrated in FIG. 4. The add comment button 50 is just one example of a user interface construct that may be provided through the issue record user interface 40 to capture a user indication that a new comment is to be entered. A previous comments display region 52 is also provided in the issue record user interface 40, for displaying any previously entered comment contents. In the example of FIG. 3, no comments have been previously entered for the associated issue record, so the previous comment display region 52 is empty.

Figure 4:
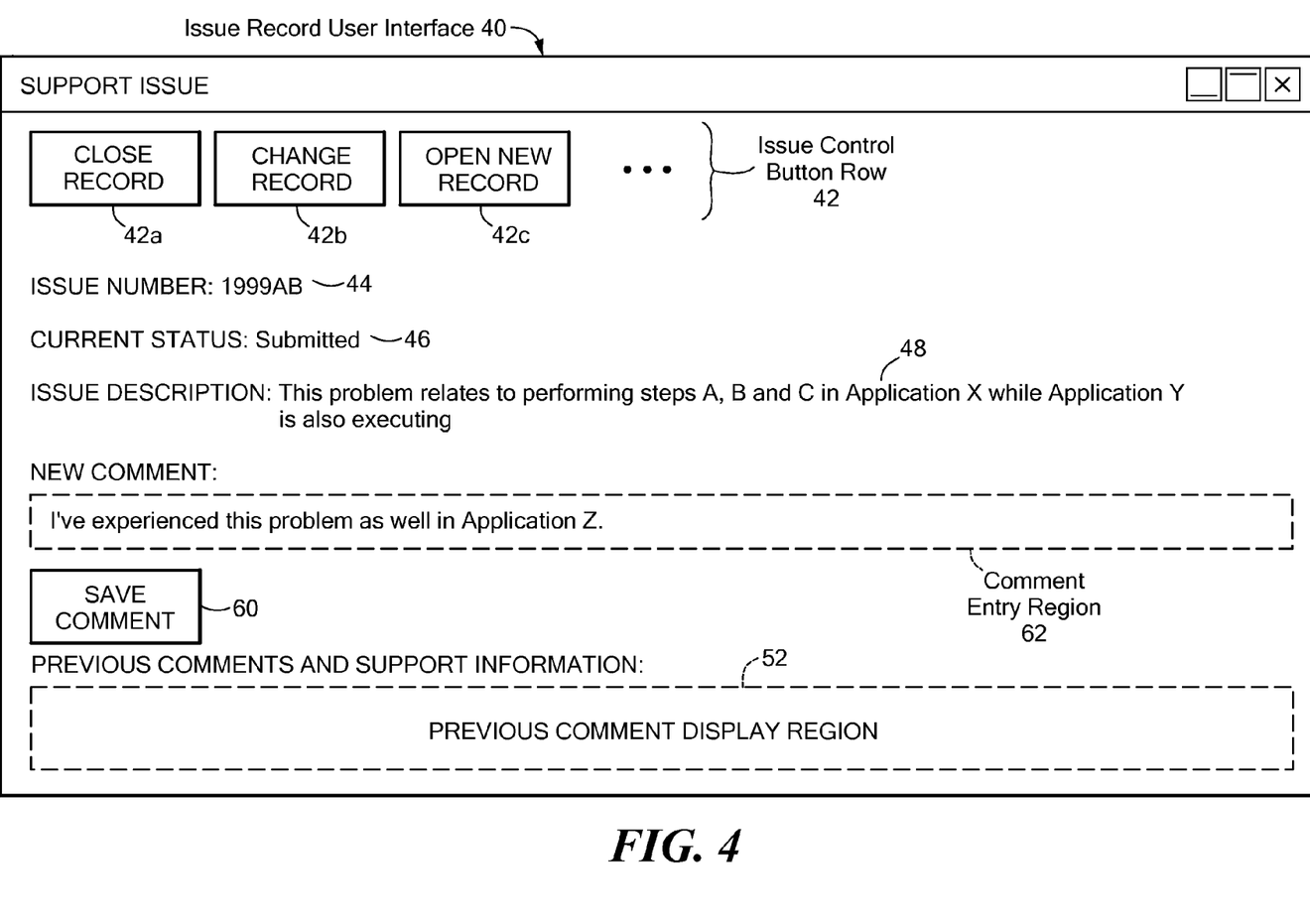
FIG. 4 is a simplified screen shot of a user interface to an issue record in an illustrative embodiment following the user has clicked on the "Add Comment" button such that a comment edit mode has been entered, and a "Save Comment" button is provided.

FIG. 4 shows the issue record user interface 40 after the user has clicked on the add comment button 50 shown in FIG. 3. As shown in FIG. 4, the issue record user interface 40 has entered a comment entry or edit mode, which includes providing a comment entry region 62, and a save comment button 60. The user can enter text or other contents for a comment into the comment entry region 62. When the user is done providing contents for a comment, the user clicks on the save comment button 60. In response to detecting the user clicking on the save comment button 60, the disclosed system creates a new comment document, independent from but associated with the issue record, storing the entered comment contents.

Figure 5:
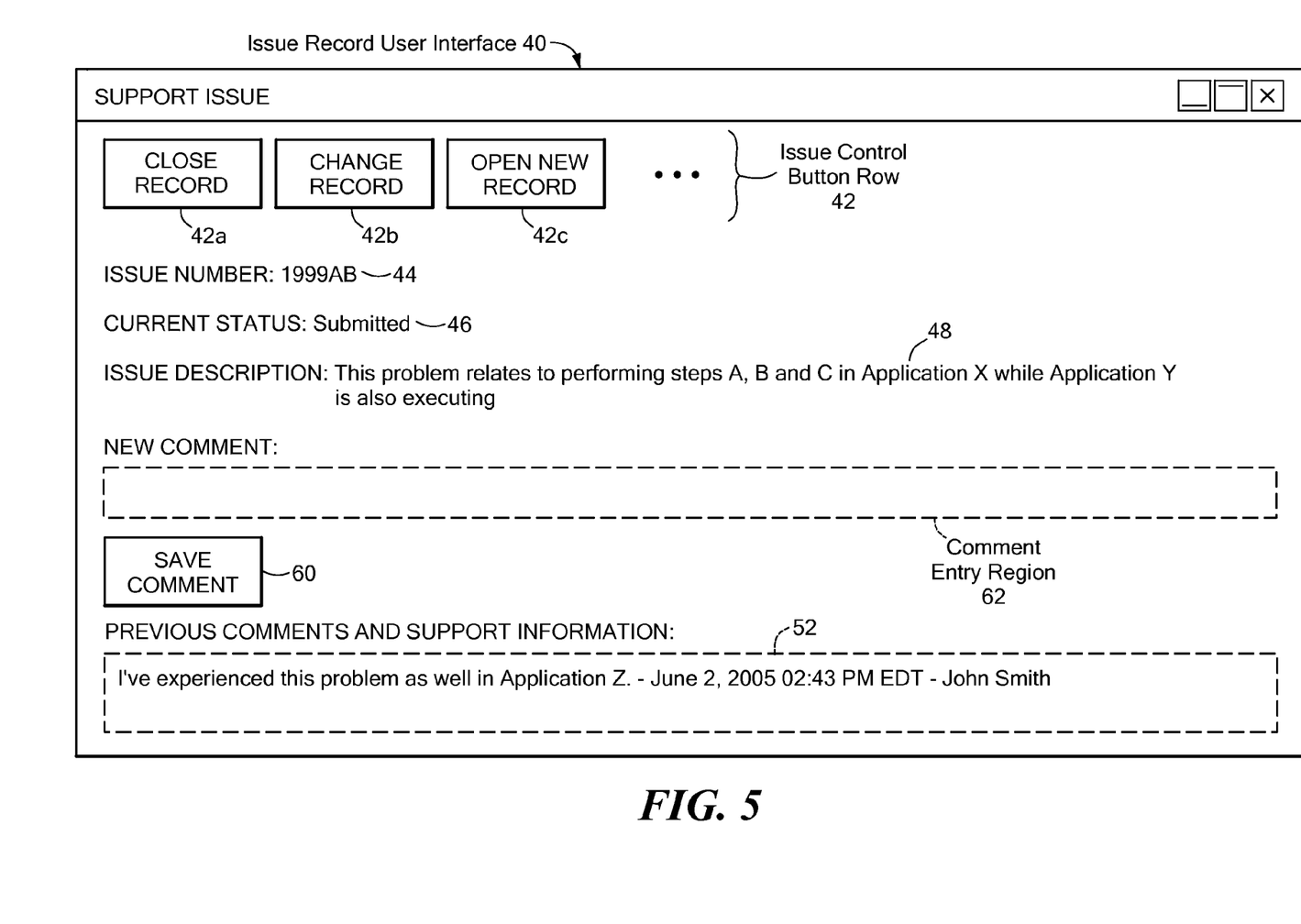
FIG. 5 is a simplified screen shot of a user interface to an issue record in an illustrative embodiment following the user clicking on the "Save Comment" button.
Figure 6:
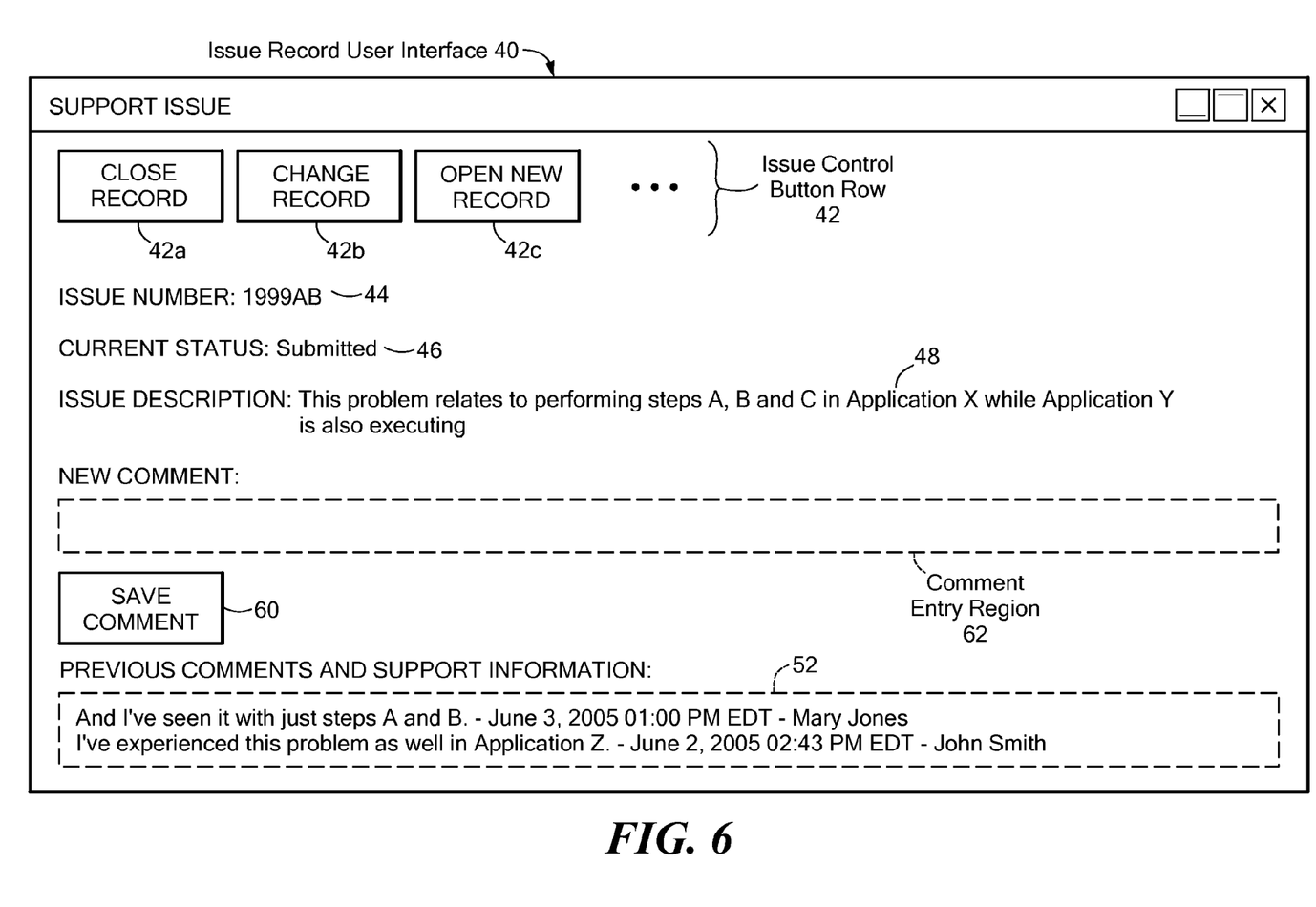
FIG. 6 is a simplified screen shot of a user interface to an issue record in an illustrative embodiment including a display region for displaying the contents of previously created comments documents related to the issue record in reverse chronological order.

FIG. 5 shows the issue record user interface 40 after the disclosed system detects a user clicking on the save comment button 60. In FIG. 5, the issue record user interface 40 shows that the text from the comment entered in FIG. 4 has been included in a list of previously entered comments contained in the previous comment display region 52. FIG. 6 shows the issue record user interface 40 after another comment has been entered with regard to the issue record associated with the issue record user interface 40. As shown in FIG. 6, both the comment entered in FIG. 4 and the subsequently entered comment are included in a reverse chronological list of comments contained in the previous comment display region 52. The reverse chronological ordering of the comments results in the most recently entered comments being displayed a the top of the comment list displayed in the previous comment display region 52. It will be noted that the comment contents displayed in the previous comment display region 52 may be obtained from multiple users on geographically distributed client computer systems interconnected by a communication network. For example, the comments in the previous comment display region 52 may be downloaded from a server system or systems shared by such multiple client computer systems.

Figure 7:
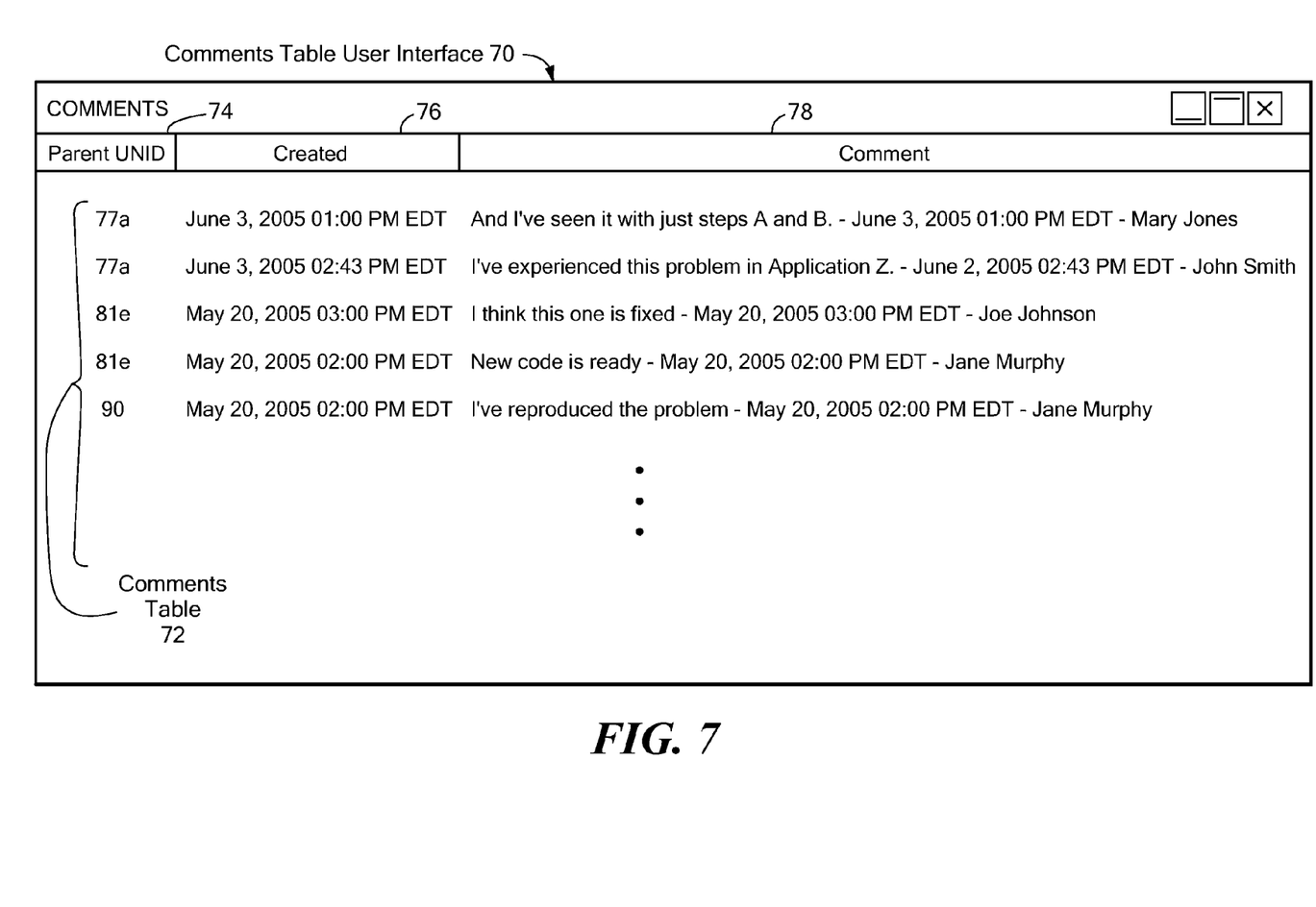
FIG. 7 is a simplified screen shot of a user interface to a table containing comments documents for issue records to which comments can still be added, in an illustrative embodiment.

FIG. 7 shows a comments table user interface 70, illustrating a table 72 of comment documents for issue records to which comments can currently be added. As shown in FIG. 7, the comments in the comments table 72 are arranged by issue record unique identifiers, shown in the parent unique identifier field 74. Within issue record unique identifier, the comments in the comments table 72 are arranged in reverse chronological order, based on creation times shown in the creation time column 76. For purposes of illustration, the comment bodies are shown in the comment body column 78. However, those skilled in the art will recognize that comment bodies need not be stored in the comment body column 78 in all embodiments, and accordingly may alternatively be located in any appropriate location or position at which they can be found by and/or associated with a corresponding parent document, such as an issue record.

The disclosed system may be embodied to use the comments table 72 to locate all comment documents for a issue record. For example, when a user requests access to an issue record that is in a state in which comments can still be added, the disclosed system operates to read the comment bodies associated with that issue record and present those comments through the previous comment display region of the user interface for that issue record. Additionally, when the status of an issue record changes to a status indicating a state in which comments cannot be added, in that the issue has been resolved, the disclosed system may operate to find all comments in the comments table 72 that are associated with that issue record, and copy the comment bodies of those associated comments into the issue record so that they will subsequently be displayed within the previous comment display region of an issue record user interface associated with that issue record, in the event that a user requests access to the issue record after comments can no longer be added.

Those skilled in the art will recognize that FIGS. 3-7 are simplified screen shots provided for illustrative and explanatory purposes only, and that the present invention may be embodied using various specific user interface screens, forms, and/or display objects to provide the functions described. Moreover, while the description of the preferred embodiments includes reference to button graphical display objects for triggering certain operations, the disclosed system is not limited to such embodiments, and other types of user interface display objects, menus, techniques and/or mechanisms may be used in the alternative.

FIGS. 1 and 2 are block diagram and flowchart illustrations of methods, apparatus(s) and computer program products according to an embodiment of the invention. It will be understood that each block of FIGS. 1 and 2, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures.

We claim:

1. A system including a computer readable memory, comprising:

program code stored on said computer readable memory for processing comment contents associated with a parent document by providing a parent document user interface including a display object enabling a user to enter comment contents, inputting said comment contents, creating a comment document associated with said parent document and storing said comment contents in said comment document, obtaining said comment contents from said comment document and displaying said comment contents within a region of said parent document user interface, detecting a change of state in said parent document from a state in which comments can be entered to a state in which comments cannot be added, copying, in response to said detecting said change of state of said parent document from said state in which comments can be added to said state in which comments cannot be added, said comment contents from said comment document into said parent document and deleting said comment document, and presenting said comment contents to said user when said parent document is in said state in which comments cannot be added as part of a user interface to said parent document after said deleting of said comment document.

2. The system of claim 1, wherein said parent document comprises an issue record in an issue tracking database, and said comment document is also stored in said issue tracking database.

3. The system of claim 1 wherein said inputting of said comment contents is through an editable region within said parent document user interface.

4. The system of claim 1, wherein said creating said comment document is completely transparent to said user.

5. The system of claim 1, wherein said obtaining of said comment contents from said comment document is responsive to determining that said state of said parent document comprises said state in which comments can be added.

6. The system of claim 1, wherein said program code stored on said computer readable memory for processing comment contents associated with said parent document further includes displaying said comment contents stored in said parent document in said region of said parent document user interface.

7. The system of claim 1, wherein said creating said comment document further comprises creating an entry for said comment document in a comment document table, wherein said entry includes a unique identifier of said parent document, wherein said unique identifier of said parent document associates said comment document with said parent document.

8. The system of claim 7, wherein said deleting said comment document comprises removing said entry for said comment document from said comment document table.

9. A computer program product including a computer readable memory, comprising:
program code stored on said computer readable memory for processing comment contents associated with a parent document by
providing a parent document user interface including a display object enabling a user to enter comment contents,
inputting said comment contents,
creating a comment document associated with said parent document and storing said comment contents in said comment document,
obtaining said comment contents from said comment document and displaying said comment contents within a region of said parent document user interface,
detecting a change of state in said parent document from a state in which comments can be entered to a state in which comments cannot be added,
copying, in response to said detecting said change of state of said parent document from said state in which comments can be added to said state in which comments cannot be added, said comment contents from said comment document into said parent document and deleting said comment document, and
presenting said comment contents to said user when said parent document is in said state in which comments cannot be added as part of a user interface to said parent document after said deleting of said comment document.

10. A system for processing comment contents associated with a parent document comprising:
means for providing a parent document user interface including a display object enabling a user to enter comment contents;
means for inputting said comment contents;
means for creating a comment document associated with said parent document and storing said comment contents in said comment document;
means for obtaining said comment contents from said comment document and displaying said comment contents within a region of said parent document user interface;
means for detecting a change of state in said parent document from a state in which comments can be entered to a state in which comments cannot be added;
means for copying, in response to said detecting said change of state of said parent document from said state in which comments can be added to said state in which comments cannot be added, said comment contents from said comment document into said parent document and deleting said comment document; and
means for presenting said comment contents to said user when said parent document is in said state in which comments cannot be added as part of a user interface to said parent document after said deleting of said comment document.

11. A non-transitory computer-readable medium having computer-executable instructions for performing a method of processing comment contents associated with a parent document comprising:
providing a parent document user interface including a display object enabling a user to enter comment contents,
inputting said comment contents,
creating a comment document associated with said parent document and storing said comment contents in said comment document,
obtaining said comment contents from said comment document and displaying said comment contents within a region of said parent document user interface,
detecting a change of state in said parent document from a state in which comments can be entered to a state in which comments cannot be added,
copying, in response to said detecting said change of state of said parent document from said state in which comments can be added to said state in which comments cannot be added, said comment contents from said comment document into said parent document and deleting said comment document, and
presenting said comment contents to said user when said parent document is in said state in which comments cannot be added as part of a user interface to said parent document after said deleting of said comment document.

* * * * *